(12) United States Patent
Che et al.

(10) Patent No.: US 11,039,296 B2
(45) Date of Patent: Jun. 15, 2021

(54) METHOD AND APPARATUS FOR DISABLING A CARRIER ESIM PROFILE

(71) Applicant: Motorola Mobility LLC, Chicago, IL (US)

(72) Inventors: Wenlong Che, Naperville, IL (US); Bharat Srinivasan, Karnataka (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/504,360

(22) Filed: Jul. 8, 2019

(65) Prior Publication Data

US 2021/0014665 A1 Jan. 14, 2021

(51) Int. Cl.
*H04W 8/18* (2009.01)
*H04W 8/20* (2009.01)
(Continued)

(52) U.S. Cl.
CPC ............ *H04W 8/183* (2013.01); *H04W 4/90* (2018.02); *H04W 8/205* (2013.01); *H04W 8/26* (2013.01); *H04W 8/30* (2013.01)

(58) Field of Classification Search
CPC ...... H04L 63/0853; H04W 4/24; H04W 4/50; H04W 4/60; H04W 4/90; H04W 8/183;
(Continued)

(56) References Cited

U.S. PATENT DOCUMENTS 8,526,408 B2 * 9/2013 Zhang ................. H04L 63/08 370/338
9,572,016 B2 * 2/2017 Cormier ............... H04W 8/183
(Continued)

FOREIGN PATENT DOCUMENTS

AP 2009004967 * 10/2009 ........... H04W 12/003
AP 2999 A * 10/2014 ............ H04W 12/06
(Continued)

OTHER PUBLICATIONS

3rd Generation Partnership Project (3GPP), Technical Specification Group Services and System Aspects, Service Aspects, Services Principles, Jun. 2019, 3GPP, Technical Specification 22.101, Version 16.2.0 (Year: 2019).*

(Continued)

*Primary Examiner* — Eric Nowlin (74) *Attorney, Agent, or Firm* — Loppnow & Chapa; Matthew C. Loppnow (57) ABSTRACT

A default modem configuration can be stored in a memory. A wireless communication carrier modem configuration corresponding to a wireless communication carrier eSIM profile can be applied to a modem. Wireless communication signals can be communicated with a wireless wide area network via the modem using the wireless communication carrier modem configuration. An input disabling the wireless communication carrier eSIM profile can be received. The wireless communication carrier modem configuration corresponding to the wireless communication carrier eSIM profile in the modem can be deactivated in response to receiving the input disabling the wireless communication carrier eSIM profile. The default modem configuration can be applied to the modem in response to receiving the input disabling the wireless communication carrier eSIM profile. Wireless communication signals can be communicated via the modem using the default modem configuration.

15 Claims, 4 Drawing Sheets

(51) Int. Cl.
*H04W 8/30* (2009.01)
*H04W 4/90* (2018.01)
*H04W 8/26* (2009.01)

(58) Field of Classification Search
CPC ....... H04W 8/205; H04W 8/26; H04W 8/265; H04W 8/30; H04W 12/0023; H04W 12/00401; H04W 12/00403; H04W 12/00514; H04W 12/06; H04W 60/00
See application file for complete search history.

(56) References Cited

U.S. PATENT DOCUMENTS

| | | | |
|---|---|---|---|
| 9,712,996 B2 * | 7/2017 | Park | H04W 8/205 |
| 9,716,990 B2 * | 7/2017 | Holtmanns | H04W 4/90 |
| 9,813,976 B2 * | 11/2017 | Velusamy | H04M 15/885 |
| 10,225,413 B2 * | 3/2019 | Velusamy | H04M 17/103 |
| 10,285,045 B2 * | 5/2019 | Prakash | H04W 8/183 |
| 10,321,303 B1 * | 6/2019 | Namiranian | H04W 8/183 |
| 10,356,604 B2 * | 7/2019 | Namiranian | H04M 17/103 |
| 10,567,952 B1 * | 2/2020 | Finger | H04W 8/183 |
| 10,616,935 B2 * | 4/2020 | Bakker | H04L 65/1069 |
| 10,687,205 B1 * | 6/2020 | Finger | H04L 9/006 |
| 10,700,856 B2 * | 6/2020 | Nix | H04L 9/30 |
| 10,708,759 B1 * | 7/2020 | Roy | H04L 67/02 |
| 10,785,645 B2 * | 9/2020 | Li | H04W 12/0023 |
| 2010/0142499 A1 * | 6/2010 | Zhang | H04L 63/08 370/338 |
| 2010/0297979 A1 * | 11/2010 | Watfa | H04W 8/205 455/404.1 |
| 2011/0194553 A1 * | 8/2011 | Sahin | H04L 12/66 370/352 |
| 2012/0052832 A1 * | 3/2012 | Bleckert | H04W 12/069 455/404.1 |
| 2012/0115439 A1 * | 5/2012 | Naito | H04L 63/0853 455/411 |
| 2012/0115440 A1 * | 5/2012 | Naito | H04L 63/0853 455/411 |
| 2012/0117210 A1 * | 5/2012 | Naito | H04L 63/0853 709/221 |
| 2012/0142305 A1 * | 6/2012 | Lane | H04N 7/18 455/404.1 |
| 2012/0157040 A1 * | 6/2012 | Naito | H04L 63/0853 455/406 |
| 2012/0260090 A1 * | 10/2012 | Hauck | H04L 63/0853 713/168 |
| 2013/0065549 A1 * | 3/2013 | Sennett | H04M 1/72436 455/404.1 |
| 2014/0308991 A1 * | 10/2014 | Lee | H04W 8/18 455/558 |
| 2015/0004955 A1 * | 1/2015 | Li | H04M 3/543 455/418 |
| 2015/0163056 A1 * | 6/2015 | Nix | H04L 9/0869 380/46 |
| 2016/0020802 A1 * | 1/2016 | Lee | H04B 1/3816 455/558 |
| 2016/0037318 A1 * | 2/2016 | Holtmanns | H04W 8/18 455/404.1 |
| 2016/0119780 A1 * | 4/2016 | Jung | H04W 8/265 455/419 |
| 2016/0302070 A1 * | 10/2016 | Yang | H04W 12/00401 |
| 2016/0345162 A1 * | 11/2016 | Li | H04L 63/0853 |
| 2017/0171742 A1 * | 6/2017 | Yang | G06F 3/0643 |
| 2017/0230900 A1 * | 8/2017 | Velusamy | H04M 15/84 |
| 2018/0013898 A1 * | 1/2018 | Velusamy | H04M 15/88 |
| 2018/0014178 A1 * | 1/2018 | Baek | H04W 8/265 |
| 2018/0109676 A1 * | 4/2018 | Yeoum | H04W 8/183 |
| 2018/0109942 A1 * | 4/2018 | Lipovkov | H04W 8/183 |
| 2018/0131699 A1 * | 5/2018 | Park | H04L 63/0853 |
| 2018/0176768 A1 * | 6/2018 | Baek | H04W 8/205 |
| 2018/0191728 A1 * | 7/2018 | Kim | H04L 63/126 |
| 2018/0295500 A1 * | 10/2018 | Yang | H04W 8/183 |
| 2018/0352530 A1 * | 12/2018 | Singh | H04W 48/16 |
| 2018/0367992 A1 * | 12/2018 | Huber | H04L 63/0853 |
| 2018/0376325 A1 * | 12/2018 | Xu | H04W 8/245 |
| 2019/0007835 A1 * | 1/2019 | Li | H04L 9/0838 |
| 2019/0028884 A1 * | 1/2019 | Namiranian | H04W 4/50 |
| 2019/0075448 A1 * | 3/2019 | Prakash | H04M 1/72561 |
| 2019/0075453 A1 * | 3/2019 | Yoon | H04L 63/0823 |
| 2019/0097794 A1 * | 3/2019 | Nix | H04L 9/0662 |
| 2019/0098488 A1 * | 3/2019 | Syed | H04L 67/306 |
| 2019/0268755 A1 * | 8/2019 | Namiranian | H04W 8/183 |
| 2019/0394814 A1 * | 12/2019 | Bakker | H04L 65/1006 |
| 2020/0007655 A1 * | 1/2020 | Namiranian | H04L 67/34 |
| 2020/0037153 A1 * | 1/2020 | Anand | H04W 48/14 |
| 2020/0084610 A1 * | 3/2020 | Salmela | H04W 8/183 |
| 2020/0084614 A1 * | 3/2020 | Xu | H04W 8/18 |
| 2020/0112854 A1 * | 4/2020 | Namiranian | G06K 7/1417 |
| 2020/0128390 A1 * | 4/2020 | Lee | H04W 4/60 |
| 2020/0169869 A1 * | 5/2020 | Finger | H04L 9/006 |
| 2020/0178070 A1 * | 6/2020 | Yang | H04W 8/245 |
| 2020/0264857 A1 * | 8/2020 | Koo | G06F 8/60 |
| 2020/0267533 A1 * | 8/2020 | Zhang | H04W 8/183 |
| 2020/0280439 A1 * | 9/2020 | Nix | H04L 9/3249 |
| 2020/0351652 A1 * | 11/2020 | Loreskar | H04W 48/18 |

FOREIGN PATENT DOCUMENTS

| | | | | |
|---|---|---|---|---|
| AU | 2008212898 A1 * | 8/2008 | | H04W 12/06 |
| AU | 2008212898 B2 * | 2/2012 | | H04W 12/003 |
| BR | PI0807096 A2 * | 8/2014 | | H04W 12/003 |
| BR | PI0807096 B1 * | 6/2020 | | H04W 12/003 |
| CA | 2676997 A1 * | 8/2008 | | H04W 12/06 |
| CA | 2676997 C * | 8/2013 | | H04L 63/08 |
| CN | 101606372 A * | 12/2009 | | H04L 63/08 |
| CN | 101902716 A * | 12/2010 | | H04W 4/90 |
| CN | 101909271 A * | 12/2010 | | H04W 4/90 |
| CN | 101877841 B * | 9/2014 | | H04W 4/90 |
| CN | 104718771 A * | 6/2015 | | H04W 12/06 |
| CN | 101606372 B * | 12/2015 | | H04W 12/06 |
| CN | 101902716 B * | 12/2015 | | H04W 4/90 |
| CN | 101909271 B * | 12/2015 | | H04W 4/90 |
| CN | 104718771 B * | 1/2019 | | H04W 8/18 |
| CN | 110531607 A * | 12/2019 | | |
| DK | 2122983 T3 * | 2/2014 | | H04W 76/50 |
| EP | 2122983 A1 * | 11/2009 | | H04W 12/003 |
| EP | 2464149 A1 * | 6/2012 | | H04N 1/00307 |
| EP | 2122983 B1 * | 12/2013 | | H04W 76/50 |
| EP | 2870787 A1 * | 5/2015 | | H04W 12/06 |
| EP | 2870787 A4 * | 3/2016 | | H04W 8/18 |
| EP | 2870787 B1 * | 10/2019 | | H04W 12/06 |
| ES | 2445647 T3 * | 3/2014 | | H04W 12/06 |
| JP | 5069320 B2 * | 11/2012 | | H04W 76/50 |
| KR | 20090116787 A * | 11/2009 | | H04W 76/50 |
| KR | 101195053 B1 * | 10/2012 | | H04L 63/08 |
| KR | 101826298 B1 * | 2/2018 | | |
| KR | 20180123803 A * | 11/2018 | | F16D 65/02 |
| KR | 20180131699 A * | 12/2018 | | |
| MX | 2009008393 A * | 8/2009 | | H04L 63/08 |
| PL | 2122983 T3 * | 4/2014 | | H04W 76/50 |
| PT | 2122983 E * | 2/2014 | | H04W 12/003 |
| RU | 2009133260 A * | 3/2011 | | H04W 76/50 |
| RU | 2428809 C2 * | 9/2011 | | H04L 63/08 |
| WO | WO-2008095918 A1 * | 8/2008 | | H04L 63/08 |
| WO | WO-2010124644 A1 * | 11/2010 | | H04W 76/50 |
| WO | WO-2012022244 A1 * | 2/2012 | | H04W 4/90 |
| WO | WO-2012022245 A1 * | 2/2012 | | H04W 4/90 |
| WO | WO-2014006457 A1 * | 1/2014 | | H04W 12/06 |

OTHER PUBLICATIONS

Schulzrinne et al., Extensions to the Emergency Services Architecture for Dealing With Unauthenticated and Unauthorized Devices, Dec. 2014, Internet Engineering Task Force (IETF), Request for Comment (RFC) 7406 (Year: 2014).*

ETSI, "Smart Cards; UICC-Terminal interface; Physical and logical characteristics (Release 15)", ETSI TS 102 221 V15.2.0, Sophia Antipolis Cedex—France, May 2019.

* cited by examiner

METHOD AND APPARATUS FOR DISABLING A CARRIER ESIM PROFILE

BACKGROUND

1. Field

The present disclosure is directed to a method and apparatus for disabling a carrier embedded Subscriber Identity Module (eSIM) profile.

2. Introduction

Presently, users use User Equipment (UE), such as wireless communication devices, to communicate over wireless networks. A Subscriber Identity Module (SIM) is used by a UE to identify the UE and allow it to access particular wireless networks, such as different networks of different carriers that provide the networks. Additionally, a UE can include an eSIM in device hardware and/or software. For example, the eSIM is implemented, such as stored in, programmed on, and/or executed on an embedded Universal Integrated Circuit Card (eUICC) that is permanently affixed to the UE. Permanently affixed being defined as not being user-removable by using only the user's fingers and/or simple tools, such as paper clips, pins, screwdrivers, and/or other simple tools. As another example, the eSIM is implemented, such as stored in, programmed on, and/or executed on a UE controller. The eSIM can also be implemented in a combination of the above examples or otherwise implemented.

For example, the eUICC is be hardware that stores the eSIM profile. The eSIM profile includes subscription and network settings for a UE and allows the UE to connect to the corresponding carrier's network. For example, the eSIM profile includes information, such as an International Mobile Subscriber Identity (IMSI) number that identifies the subscriber to a network carrier. The IMSI includes a home Mobile Country Code (MCC) and a Mobile Network Code (MNC). The IMSI also includes a Mobile Subscription Identification Number (MSIN) that is unique to a subscriber, such as a user of the UE that subscribes to a particular carrier. The eSIM profile also includes other information, such as a Personal Identification Number (PIN), authentication keys, and other information.

An eSIM profile can be stored in an operator's eSIM subscription management server, such as a Subscription Manager Data Preparation (SM-DP). The eSIM subscription management server can securely download the eSIM profile onto the eUICC of a UE. The eSIM profile can also be pre-programmed onto the eUICC.

For example, a UE can be loaded in a factory with a set of eSIM profiles, including different carrier eSIM profiles, and one of the profiles can be selected to be the active one. To elaborate, an eSIM manufacturer can load a default set of profiles onto the card before sending it to the Original Equipment Manufacturer (OEM)/Original Design Manufacturer (ODM). There are also ways to download a profile to the eSIM using an over-the air technique, such as over a wireless local area network, a wired network, or other techniques, to configure/program a new profile on the eSIM, such as after a subscriber has signed a contract with a carrier. For example, a carrier can program the card over the air with a new profile, once the subscriber has signed a contract with the carrier. Using an eUICC Identification (EID) of the eSIM, the carrier can create a profile, such as a soft SIM, suitable for that subscriber and let him download it from their Subscription Manager Data Preparation (SMDP+) server. For simplicity sake, each profile on the eSIM can be considered to be an individual SIM card independent of each other.

Users are only allowed to disable a carrier eSIM profile or enable a different carrier eSIM profile in a settings menu of a UE, as there is no physical SIM slot that allows the user to remove a SIM corresponding to the carrier profile. When the user disables a carrier eSIM profile, a modem of the UE still retains features of the carrier's corresponding modem configuration. These features can be useful for a particular carrier, but can cause adverse effects when the carrier's profile is disabled, but the features remain configured on the modem. For example, having no profile on the eSIM is actually not equivalent to physically taking out the SIM from physical SIM capable device. During the disabling profile process, a SIM refresh by a eUICC soft reset is requested by an eSIM hardware module and the modem notifies the eSIM hardware module that there is no SIM application on eSIM, despite the eSIM's always-on power state.

For example, when an end-user disables a particular carrier's eSIM profile via a device user interface, the emergency call list of emergency telephone numbers, such as 911, 112, and other numbers specific to the carrier, and modem carrier features specific to the carrier are still functional, as the eSIM power state remains on although there is no longer any active profile on it. Some of the carrier features are desirable when using the particular carrier, but may not be useful when not using the carrier.

The end-user may encounter problems when deactivating a carrier eSIM profile due to the carrier features remaining present on the modem even though the carrier eSIM profile was deactivated. For example, on a legacy UE that uses a physical SIM slot, a hard-coded emergency call list will be used for the no physical SIM case. However, if a carrier's eSIM profile is disabled, the UE may fail to dial some emergency numbers, such as 000, 08, 110, 999, 118, 119, and 190, that are supposed to be supported on a legacy SIM capable UE without a physical SIM inserted. Thus, there is a need for a method and apparatus for disabling a carrier eSIM profile.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for disabling a carrier embedded Subscriber Identity Module (eSIM) profile. According to a possible embodiment, a default modem configuration can be stored in a memory. A wireless communication carrier modem configuration corresponding to a wireless communication carrier eSIM profile can be applied to a modem. Wireless communication signals can be communicated with a wireless wide area network via the modem using the wireless communication carrier modem configuration. An input disabling the wireless communication carrier eSIM profile can be received. The wireless communication carrier modem configuration corresponding to the wireless communication carrier eSIM profile in the modem can be deactivated in response to receiving the input disabling the wireless communication carrier eSIM profile. The default modem configuration can be applied to the modem in response to receiving the input disabling the wireless communication carrier eSIM profile. Wireless communication signals can be communicated via the modem using the default modem configuration.

Figure 1:
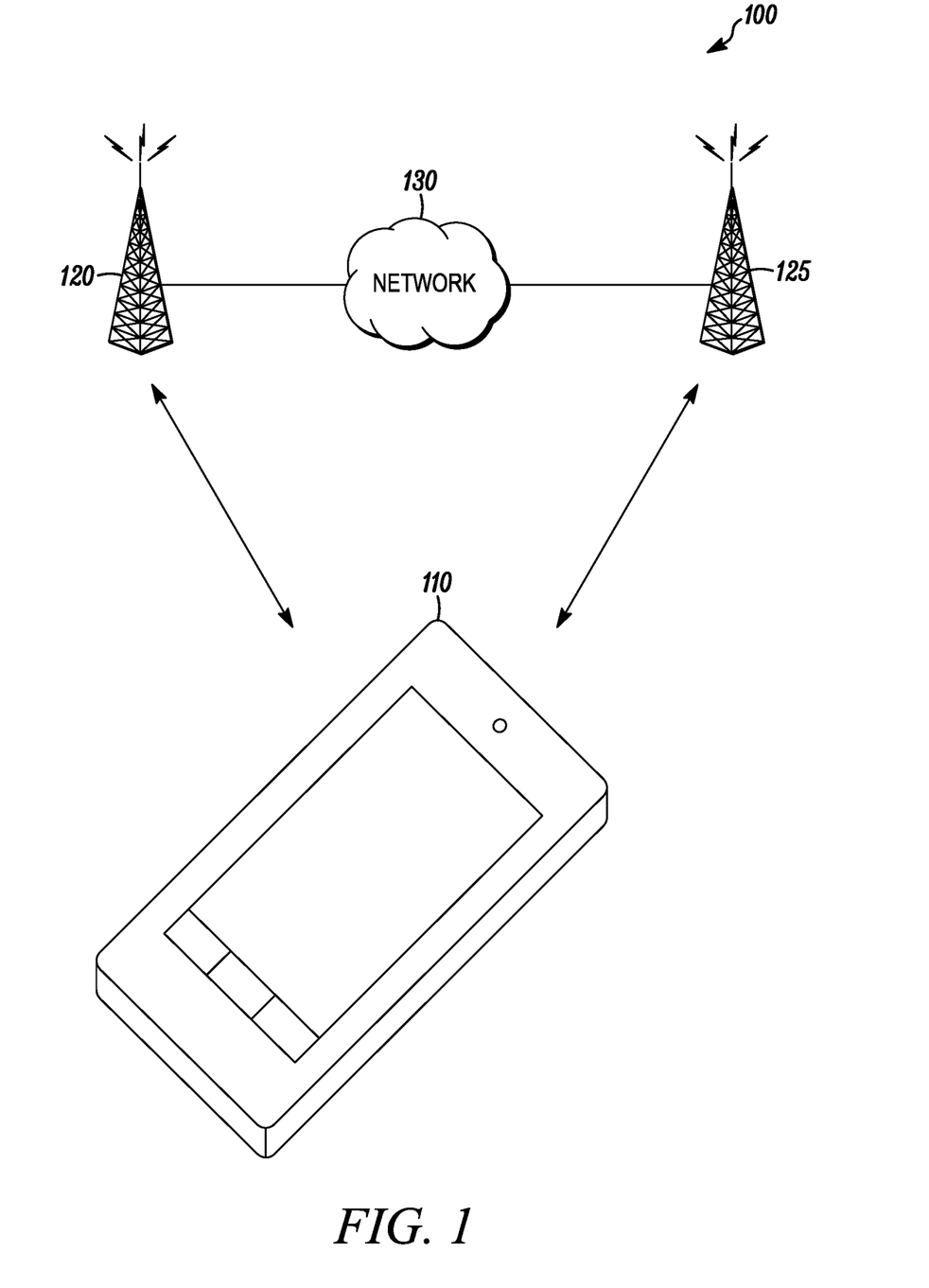
FIG. 1 is an example diagram of a system according to a possible embodiment.

FIG. 1 is an example diagram of a system 100 according to a possible embodiment. The system 100 can include a UE 110, at least one network entity 120 and 125, such as a base station, and a network 130. The UE 110 can be a wireless wide area network device, a user device, a wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

Figure 2:
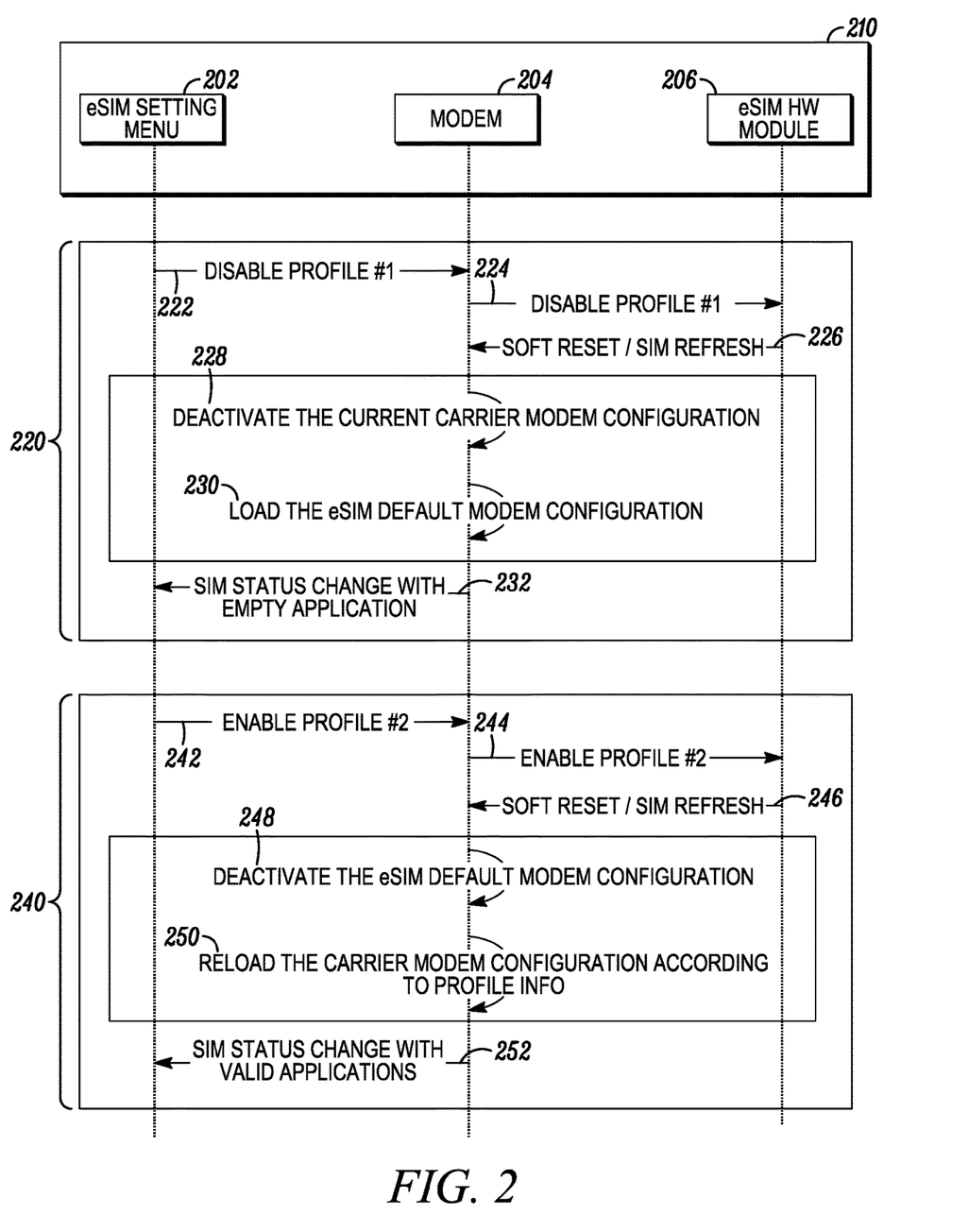
FIG. 2 is an example signal flow diagram illustrating operations of a device according to a possible embodiment.

FIG. 2 is an example signal flow diagram 200 illustrating operations of a device 210, such as the UE 110, according to a possible embodiment. The device 210 can include an eSIM setting menu 202, a modem 204, and an eSIM hardware module 206. An eSIM setting menu can be a specification defined Local Profile Assistant (LPA) software module that can exist on eSIM enabled devices. This can be a user interface element that allows an end-user to enable, disable, delete, and/or download an eSIM profile.

In operation, in a disabling a carrier profile process 220, at 222, the eSIM setting menu 202 can receive a user input to disable a carrier profile and can send a corresponding signal to the modem 204. For example, different commands can be issued from the user interface, such as the LPA, to the modem 204 and/or the eSIM 206, which can also be considered a eUICC. Some of the commands can include Enable Profile, Disable Profile, Get Profile List, Delete Profile, and other commands. These commands can be issued after the eSIM 206 is powered up. The Disable Profile command can disable the currently active profile and subsequently there will be no active profile on the eSIM 206.

At 224, the modem 204 can send a corresponding signal to disable the carrier profile to the eSIM 206. At 226, the eSIM 206 can send a soft reset/SIM refresh signal to the modem 204. At 228, the modem 204 can deactivate a current modem configuration corresponding to the carrier eSIM profile. At 230, the modem 204 can load an eSIM default modem configuration.

At 232, the modem 204 can send a SIM status change with empty application signal to the eSIM setting menu 202. The SIM status change message can be transferred from the modem to the eSIM setting menu after applying the default eSIM profile. SIM Status change messages, can be messages sent from the modem 204 to other software entities/modules on the UE 201 informing them about the changes in the status of the eSIM 206. This can be comparable to an eSIM state transition diagram. A NO SIM state can mean there is no physical SIM inserted. In a removable SIM scenario, this status can indicate that either the user has removed the physical SIM or that the UE 210 was powered up without a SIM. With an eSIM 206, this may not be a possible state since the eSIM is never removable and an eSIM detect line, such as low/high, will indicate the presence of the eSIM 206. A SIM DETECTED state can mean a SIM is inserted/detected. This can usually be indicated after Answer-To-Reset (ATR) and Protocol and Parameter Selection (PPS) signals are successfully communicated. In the case of an eSIM, this can usually be the first state in the state transition. A SIM ACTIVATING state can mean a SIM application is selected and the specification defined procedures for activation are initiated. This can usually be a transitional state and the UE 210 can remain in this state if either a SIM PIN has not been verified by the user or if the UE 210 is personalization locked and requires entry of an unlock password. A SIM ACTIVATED state can mean an SIM is completely operational. For example, it can mean initialization procedures have been completed. Profile related operations can be done in the DETECTED, ACTIVATING, and/or ACTIVATED states.

In an enabling a carrier profile process 240, at 242 the eSIM setting menu 202 can receive a user input to enable a carrier profile and can send a corresponding signal to the modem 204. At 244, the modem 204 can send a corresponding signal to enable the carrier profile to the eSIM 206. At 246, the eSIM 206 can send a soft reset/SIM refresh signal to the modem 204. At 248, the modem 204 can deactivate the default modem configuration corresponding to the default eSIM profile. At 250, the modem 204 can reload the carrier modem configuration corresponding to the carrier eSIM profile. At 252, the modem 204 can send a SIM status change with valid application signal to the eSIM setting menu 202.

At least some embodiments can provide for dynamically reloading SIM-based modem configurations when toggling profiles for an eSIM capable device. When disabling a current carrier profile, the current carrier modem configuration can be deactivated and an eSIM default modem configuration can be loaded. When enabling a new profile, the eSIM default modem configuration can be deactivated and the carrier modem configuration can be reloaded or a different carrier modem configuration can be loaded according to carrier eSIM profile information.

According to a possible embodiment, the modem 204 can store modem configurations for each carrier in an Embedded File System (EFS) in its memory. The modem configurations can each include an emergency call list and a feature list. The modem 204 can read the MCC/MNC from the eSIM profile on the eSIM 206. The modem 204 can search the modem configurations in the EFS for the modem configuration corresponding to the MCC/MNC read from the eSIM 206. The modem 204 can load the corresponding modem configuration.

For example, the modem configurations can be located in a certain directory in the modem's EFS and the emergency call list and feature list can be located in other directories. The modem configurations can include the directories of the modem's EFS and the emergency call list and feature list along with the values that should be used in the corresponding directories for the particular modem configuration. When a particular modem configuration is loaded, the values can be taken from the modem configuration and (over) written in the corresponding directory.

As a more particular example, the EFS can be in a memory of the modem 204. It can be organized as a Linux file system, a Unix-like system, or other file system at runtime. The modem configurations can originally be put into a path, such as /nvm/mcfg/cfg_01/, at a factory, during a software upgrade, or otherwise put into the path. As a further example, there can two modem configurations stored in /nvm/mcfg/cfg_01/. A configuration called mcfg_swPQ7 can be a provider's modem configuration and one called mcfg_swDT5 can be an eSIM default modem configuration. According to at least some embodiments, when the provider's eSIM profile is disabled via a user interface, the eSIM default modem configuration, mcfg_swDT5, can be loaded by replacing/overwriting the current emergency call list item in a directory, such as /nv/item_files/pbm_ecc_nums, with the new emergency call list corresponding to the default modem configuration and by replacing/overwriting a current feature list item in a directory, such as /nvm/num/8002, with the feature list corresponding to the default modem configuration. The items that should be overwritten can be defined with a full path name and data in a modem configuration image.

As a further example, the modem configuration files can be stored under a path, such as /nvm/mcfg/cfg_01/, with unique hash numbers and thus, they can be indexed randomly. For example, as described above, the modem configuration files can be named mcfg_swDT5, mcfg_swPQ7, and other filenames with unique hash numbers. When the modem 204 obtains the MCC/MNC from the eSIM, it can traverse all of modem configurations under /nvm/mcfg/cfg_01/ by opening each image and comparing its MCC/MNC record with the eSIM's MCC/MNC record. If matched, the particular modem configuration can be loaded.

Features of a particular carrier's feature list can include protocol configuration option features, property location status feature that sends MCC and MNC information of a camped or registered network to a SIM, enhanced network services features, and other features useful for operating a UE on a carrier's network.

According to a possible implementation regarding modem configurations, a modem configuration task running in the modem 204, such as on a controller, can load all contents in a modem configuration file when the field of MCC/MNC pair is matched with the eSIM profile. For example, when the user enables a carrier's eSIM profile via a user interface, the modem configuration task can read the MCC/MNC from the eSIM, and search all modem configuration files in the modem EFS for the corresponding modem configuration.

Embodiments can provide for making the modem 204 behave in a manner similar to a case where a physical SIM is taken out of a physical SIM capable device. For example, a current carrier modem configuration can be deactivated, such as disabled. Deactivating the current carrier modem configuration can include removing the carrier specific emergency call list and disabling specific modem features corresponding to the carrier. Then, a default modem configuration can be loaded. When loading the default modem configuration, the emergency call list can be overwritten with the content that can be the same as a hard-coded emergency call list and a modem feature list for a no SIM case can be used. In this case, the UE 210 can be effectively changed to a regular SIM capable device without a SIM inserted.

According to a possible embodiment, the default eSIM profile can stand for a combination of a dummy eSIM profile key, such as, for example, MCC/MNC is 000/00, 999/99, or other dummy numbers, and its matched modem configuration including a full emergency number call list and a modem feature list for a no SIM case. According to a possible implementation, the default eSIM profile configuration can be applied to the modem 204 after Attention-To-Reset, as the loading modem logic can then get the key of MCC/MNC, such as 000/00, from an empty eSIM.

To elaborate, the active profile can be deselected, which can mean that there is no profile that is active on the eSIM. This can be equivalent to a no SIM scenario, where there is no physical SIM present, but not exactly because from the perspective of the UE 210, there is a SIM inserted but it is empty. In this case of a no active profile on the eSIM, carrier specific items can be unloaded and a default configuration can be loaded. The default configuration can be defined not by the eSIM, but by the OEM/ODM so it will work like a no SIM scenario. As mentioned above, when the first carrier eSIM profile is de-selected, all of the corresponding carrier's related configuration items can be removed and emergency call numbers retrieved from the carrier's eSIM profile can be unloaded. Then, an emergency call list that can work anywhere can be loaded for the default configuration. The device can camp to a wireless network for emergency services, but the default device configuration can be the one that defines the list of valid emergency numbers. Thus, when the user dials an emergency number, the UE 210 can check if the dialed number is present in the emergency list and only if it is present will it place an emergency call.

Embodiments can prevent the UE 210 from locking up based on a carrier's features being present that cause the UE to lock up when the carrier's profile is deactivated. This can be done by unloading the carrier configuration data that was used to lock the UE 210 to the carrier when there is no active selected profile.

Figure 3:
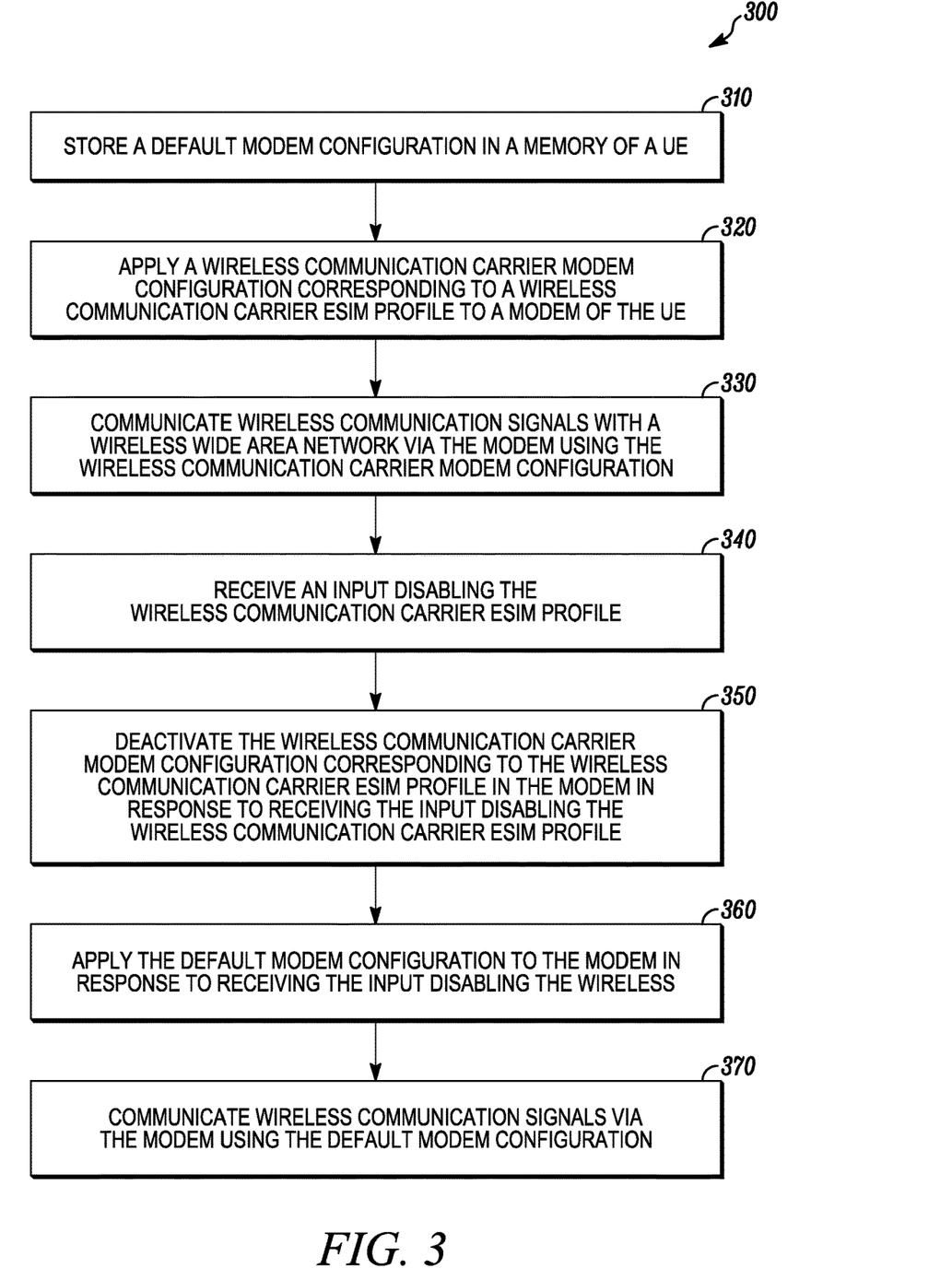
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, a default modem configuration can be stored in a memory of a UE. The default modem configuration can be stored in a memory of the UE by being stored in a memory of a modem, being stored in RAM, being stored in solid state memory, and/or otherwise stored in the memory of the UE. The memory of the UE can include multiple different memory modules. For example, a default eSIM profile can be stored in a first memory of the UE and the default modem configuration can be stored in a second memory of the UE, where the second memory can be in, for example, an EFS in a modem of the UE. Alternately, the default eSIM profile and the default modem configuration can be stored in the same memory module. The default modem configuration can include an emergency call list and a modem feature list, both corresponding to the absence of a physical SIM, such as the absence of a SIM profile.

At 320, a wireless communication carrier modem configuration corresponding to a wireless communication carrier eSIM profile can be applied to the modem of the UE. A wireless communication carrier can also be considered a carrier, an operator, a service provider, and/or any other type of wireless communication carrier. The wireless communication carrier eSIM profile can be pre-stored in the UE, can be obtained over a wireless connection, can be obtained over a wired connection, and/or can be otherwise obtained.

For example, an eSIM profile can be used for modem configuration. The modem can search/obtain a SIM modem configuration list by using an MCC/MNC from an enabled/active profile and can then load/activate the modem configuration that matches the eSIM profile. The SIM modem configuration list can be stored in a modem EFS partition in the memory of the modem. The searching logic can be invoked when the MCC/MNC is ready to be read from eSIM profile.

At 330, wireless communication signals can be communicated with a wireless wide area network with via the modem using the wireless communication carrier modem configuration. Communicating can include transmitting and/or receiving wireless communication signals.

At 340, an input disabling the wireless communication carrier eSIM profile can be received. Receiving an input disabling the wireless communication carrier eSIM profile can include receiving a user input on a user interface of the UE. For example, the user input can be received via a touchpad, a touchscreen, a microphone, and/or otherwise received from a user. The input can select an option to disable the wireless communication carrier eSIM profile.

At 350, the wireless communication carrier modem configuration corresponding to the wireless communication carrier eSIM profile can be deactivated in the modem in response to receiving the input disabling the wireless communication carrier eSIM profile. Deactivating the wireless communication carrier modem configuration can include deleting a carrier feature list corresponding to the wireless communication carrier eSIM profile from the modem memory. For example, the feature list corresponding to the wireless communication carrier eSIM profile can be deleted from one section of the modem memory but retained in another section of the modem memory.

At 360, the default modem configuration can be applied to the modem in response to receiving the input disabling the wireless communication carrier eSIM profile. For example, the default modem configuration can be applied by updating a feature list in a memory of the modem from a feature list corresponding to the default modem configuration. The memory of the modem can be considered to be the memory of the UE recited above, as it is present in the UE as a part of the modem in the UE, or can be considered a second memory. A carrier feature list can include a list of features defined and enabled for particular carrier. A default modem configuration feature list can include a list of features defined and enabled for the absence of a carrier (e)SIM profile. For example, features in the feature list of a particular carrier can include LTE band preference, Voice Over LTE Support, IMS Presence support, and other features. As a further example, the feature list corresponding to the default modem configuration can include features for operation of the UE when there is no wireless communication carrier modem configuration loaded on the modem. Applying the default modem configuration further can include updating a list of emergency phone numbers for operation of the UE when there is no wireless communication carrier modem configuration loaded on the modem. There can be no wireless communication carrier modem configuration loaded on the modem when there is no active eSIM profile, when there is no SIM card present, or when there is otherwise no wireless communication carrier modem configuration loaded on the modem.

Applying a modem configuration to the modem can also include loading or transferring certain contents of the modem configuration in modem memory, operating the modem based on the modem configuration, executing modem operations using information in the modem configuration, and/or any other operations for applying a modem configuration to a modem. Applying a modem configuration can additionally include changing a pointer to a location in modem memory including the modem configuration that is being applied.

According to a possible embodiment, a default eSIM profile can be stored in the memory and applying the default modem configuration can include updating feature list in the memory of the modem with a feature list corresponding to the default modem configuration that corresponds to the default eSIM profile in response to receiving the input disabling the wireless communication carrier eSIM profile. For example, a feature list in the memory of the modem can be updated from a feature list corresponding to the default eSIM profile. The default eSIM profile can be stored in a memory of the UE by being stored in RAM, being stored in solid state memory, being stored on a flash drive, and/or otherwise stored in the memory of the UE.

Updating a feature list in the memory of the modem can include obtaining default eSIM profile information including an MCC and an MNC from the default eSIM profile. Then, default modem configuration information can be obtained from a first portion of the memory of the modem based on the default profile information. The default modem configuration information can include the feature list corresponding to the default eSIM profile. The default modem configuration information can be stored in a second portion of the memory of the modem.

According to a possible implementation the default profile MCC/MNC can be assumed to be 000/00 or other default and/or unassigned MCC/MNC numbers. Alternately, when there is no match of MCC/MNC or if the MCC/MNC is unavailable, as can be the case when disabling an eSIM profile and no active eSIM profile is selected, then the default modem configuration can be loaded. For example, the default modem configuration can be marked or tagged as a default modem configuration that is used when no active eSIM profile is selected.

According to another possible embodiment, applying the carrier modem configuration corresponding to the wireless communication carrier eSIM profile to the modem can include obtaining wireless communication carrier profile information including a first MCC and a first MNC from the wireless communication carrier eSIM profile. A wireless communication carrier modem configuration corresponding to the wireless communication carrier profile information can be activated. The default modem configuration can be applied by overwriting the wireless communication carrier modem configuration with the default modem configuration.

At 370, wireless communication signals can be communicated via the modem using the default modem configuration. For example, wireless communication signals can be transmitted and received via the modem.

According to a related reciprocal embodiment, an input enabling the wireless communication carrier eSIM profile can be received. The default modem configuration can be deactivated in response to receiving the input enabling the wireless communication carrier eSIM profile. The wireless communication carrier modem configuration corresponding to the wireless communication carrier eSIM profile can be applied to the modem in response to receiving the input enabling the wireless communication carrier eSIM profile. Wireless communication signals can be communicated with a wireless wide area network via the modem using the wireless communication carrier modem configuration.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
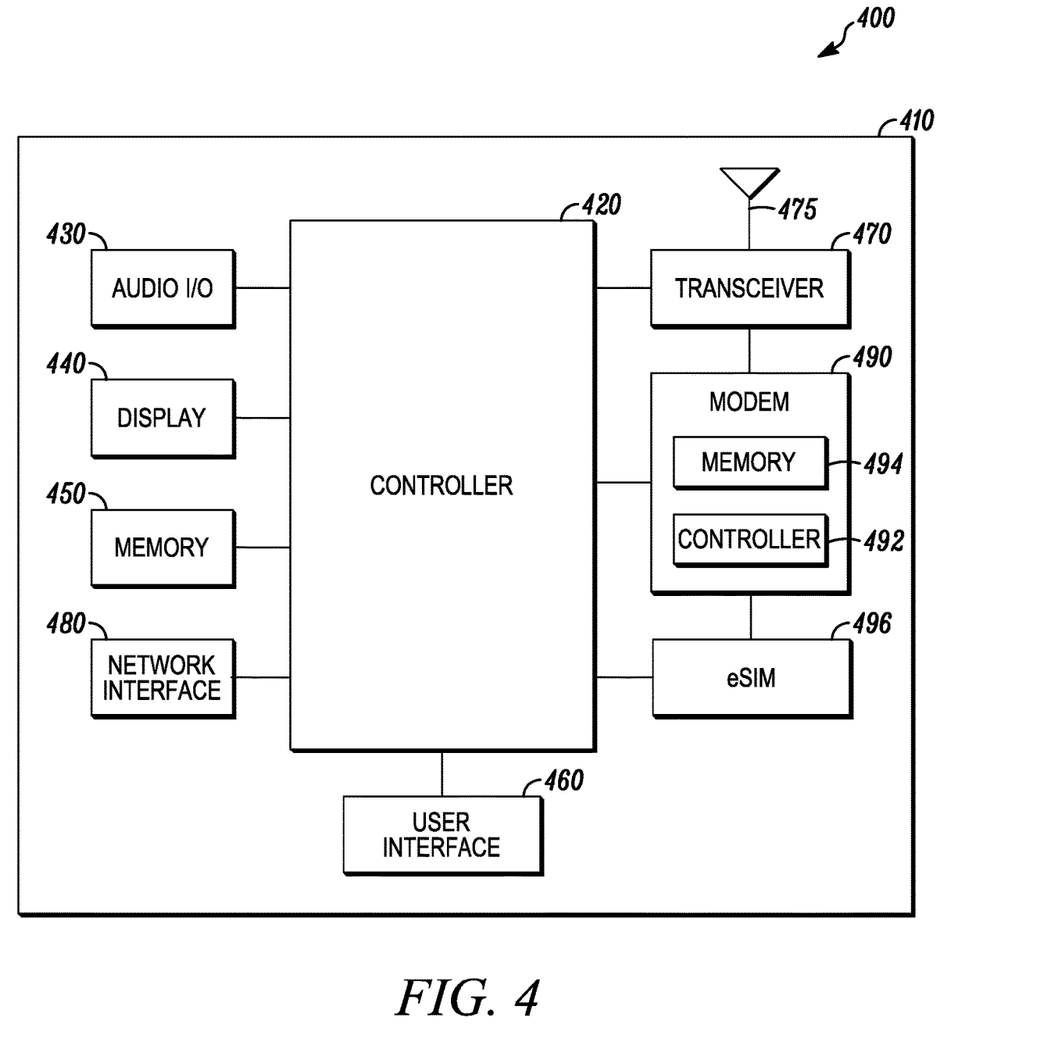
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna 475 coupled to the transceiver 470, a network interface 480 coupled to the controller 420, an eSIM 496 coupled to the controller 420, and a modem 490 coupled to the controller 420, the eSIM 496, and the transceiver 475. The modem 490 can include its own controller 492 and its own memory 494. According to a possible embodiment, the transceiver 470 can be considered a part of or can be considered a separate entity from the modem 490. The apparatus 400 may not necessarily include all of the illustrated elements for different embodiments of the present disclosure. The apparatus 400 can perform the methods described in all the embodiments.

The display 440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The user interface 260 can also be considered part of the display 440 when the display 440 is a touch screen. The network interface 480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 and/or the memory 494 can include a Random-Access Memory (RAM), a Read Only Memory (RON), an optical memory, a solid-state memory, a flash memory, a removable memory, a hard drive, a cache, or any other memory that can be coupled to an apparatus. Additionally, memory 450 and/or the modem memory 494 can include instructions for execution by the controller 420 and/or the modem controller 492 and can include storage space for stored information.

The apparatus 400, the controller 420, and/or the controller 492 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, the memory 494, elsewhere on the apparatus 400, in cloud storage, and/or anywhere else that can store software and/or an operating system. The apparatus 400, the controller 420, and/or the controller 492 may also use hardware to implement disclosed operations. For example, the controller 420 and/or the controller 492 may be any programmable processor. Furthermore, the controller 420 and/or the controller 492 may perform some or all of the disclosed operations. For example, some operations can be performed using cloud computing and the controller 420 and/or the controller 492 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 and/or the controller 492 may be any controller or processor device or devices capable of operating an apparatus and implementing the disclosed embodiments. Some or all of the additional elements of the apparatus 400 can also perform some or all of the operations of the disclosed embodiments.

In operation, the transceiver 470 can transmit and receive signals, including control signals and data signals and including information, such as control and data information. The controller 420 can generate and process the transmitted and received signals and information.

According to a possible embodiment, the controller 420 can control operations of the apparatus 400. The modem 490 can communicate wireless communication signals via the transceiver 470. The eSIM 496 can store a wireless communication carrier eSIM profile. The controller 420 can apply a wireless communication carrier modem configuration corresponding to the wireless communication carrier eSIM profile to the modem 490. The controller 420 can communicate wireless communication signals with a wireless wide area network via the modem 490 using the wireless communication carrier modem configuration.

The user interface 460 can receive an input disabling the wireless communication carrier eSIM profile. For example, the display 440 can display an option to disable the wireless communication carrier eSIM profile and the received input can select the option to disable the wireless communication carrier eSIM profile. The controller 420 can deactivate the wireless communication carrier modem configuration corresponding to the wireless communication carrier eSIM profile in the modem 490 in response to receiving the input disabling the wireless communication carrier eSIM profile. The controller 420 can deactivate the wireless communication carrier modem configuration by deleting a carrier feature list corresponding to the wireless communication carrier eSIM profile from the modem memory 494.

The memory 450 and/or 494 can store a default modem configuration. The default modem configuration can include an emergency call list and a modem feature list corresponding to the absence of a physical SIM and/or a SIM profile. The controller 420 and/or 492 can apply the default modem configuration to the modem 490 in response to receiving the input disabling the wireless communication carrier eSIM profile. According to a possible embodiment, the controller 420 and/or 492 can apply the default modem configuration by updating a feature list in the memory 494 from a feature list corresponding to the default modem configuration. According to a possible implementation, the feature list corresponding to the default modem configuration can include features for operation of the apparatus 400 when there is no wireless communication carrier modem configuration loaded on the modem 490. The controller 420 and/or 492 can further apply the default modem configuration by updating a list of emergency phone numbers in the memory 494 for operation of the apparatus 400 when there is no wireless communication carrier modem configuration loaded on the modem 490. According to another possible embodiment, the controller 420 and/or 492 can update the feature list by updating the feature list in the modem memory 494 with a feature list corresponding to the default modem configuration that corresponds to the default eSIM profile in response to receiving the input disabling the wireless communication carrier eSIM profile.

According to another possible embodiment, the controller 420 and/or 492 can apply the wireless communication carrier modem configuration corresponding to the wireless communication carrier eSIM profile to the modem 490 by obtaining wireless communication carrier profile information including a first MCC and a first MNC from the wireless communication carrier eSIM profile, and by activating a wireless communication carrier modem configuration corresponding to the wireless communication carrier profile information. The controller 420 and/or 492 can apply the default modem configuration by overwriting the wireless communication carrier modem configuration in the memory 494 with the default modem configuration.

The controller 420 can communicate wireless communication signals via the modem 490 using the default modem configuration. For example, the controller 420 can transmit and receive signals via the modem 490.

According to a possible embodiment the user interface 460 can receive an input enabling the wireless communication carrier eSIM profile. The controller 420 and/or 492 can deactivate the default modem configuration in response to receiving the input enabling the wireless communication carrier eSIM profile. The controller 420 and/or 492 can apply the wireless communication carrier modem configuration corresponding to the wireless communication carrier eSIM profile to the modem 490 in response to receiving the input enabling the wireless communication carrier eSIM profile. The controller 420 can communicate wireless communication signals with the wireless wide area network via the modem 490 using the wireless communication carrier modem configuration.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   storing a default modem configuration in a memory of a user equipment;
   applying a wireless communication carrier modem configuration corresponding to a wireless communication carrier embedded subscriber identity module profile to a modem of the user equipment;
   communicating with a wireless wide area network via the modem using the wireless communication carrier modem configuration;
   receiving an input disabling the wireless communication carrier embedded subscriber identity module profile;
   deactivating the wireless communication carrier modem configuration corresponding to the wireless communication carrier embedded subscriber identity module profile in the modem in response to receiving the input disabling the wireless communication carrier embedded subscriber identity module profile;
applying the default modem configuration to the modem in response to receiving the input disabling the wireless communication carrier embedded subscriber identity module profile; and
communicating via the modem using the default modem configuration,
wherein applying the default modem configuration comprises updating a feature list in a memory of the modem from a feature list corresponding to the default modem configuration,
wherein the feature list corresponding to the default modem configuration includes features for operation of the user equipment when there is no wireless communication carrier modem configuration loaded on the modem, and
wherein applying the default modem configuration further comprises updating a first list of emergency phone numbers with a second list of emergency phone numbers for operation of the user equipment when there is no wireless communication carrier modem configuration loaded on the modem, where the second list is different from the first list.

2. The method according to claim 1, further comprising storing a default embedded subscriber identity module profile in the memory,
wherein updating the feature list comprises updating the feature list in the memory of the modem with a feature list corresponding to the default modem configuration that corresponds to the default embedded subscriber identity module profile in response to receiving the input disabling the wireless communication carrier embedded subscriber identity module profile.

3. The method according to claim 2, wherein updating the feature list in the memory of the modem comprises:
obtaining default embedded subscriber identity module profile information including a mobile country code and a mobile network code from the default embedded subscriber identity module profile;
obtaining default modem configuration information from a first portion of the memory of the modem based on the default profile information, the default modem configuration information including the feature list corresponding to the default embedded subscriber identity module profile; and
storing the default modem configuration information in a second portion of the memory of the modem.

4. The method according to claim 1,
wherein applying the carrier modem configuration corresponding to the wireless communication carrier embedded subscriber identity module profile to the modem comprises:
obtaining wireless communication carrier profile information including a first mobile country code and a first mobile network code from the wireless communication carrier embedded subscriber identity module profile; and
activating a wireless communication carrier modem configuration corresponding to the wireless communication carrier profile information, and
wherein applying the default modem configuration comprises overwriting the wireless communication carrier modem configuration with the default modem configuration.

5. The method according to claim 1, wherein the default modem configuration includes an emergency call list and a modem feature list corresponding to the absence of a physical subscriber identify module.

6. The method according to claim 1, wherein deactivating the wireless communication carrier modem configuration comprises deleting a carrier feature list corresponding to the wireless communication carrier embedded subscriber identity module profile from the memory.

7. The method according to claim 1, wherein receiving an input disabling the wireless communication carrier embedded subscriber identity module profile comprises receiving the input on a user interface of the user equipment, where the input selects an option to disable the wireless communication carrier embedded subscriber identity module profile.

8. The method according to claim 1, further comprising:
receiving an input enabling the wireless communication carrier embedded subscriber identity module profile;
deactivating the default modem configuration in response to receiving the input enabling the wireless communication carrier embedded subscriber identity module profile;
applying the wireless communication carrier modem configuration corresponding to the wireless communication carrier embedded subscriber identity module profile to the modem in response to receiving the input enabling the wireless communication carrier embedded subscriber identity module profile; and
communicating with the wireless wide area network via the modem using the wireless communication carrier modem configuration.

9. An apparatus comprising:
a controller that controls operations of the apparatus;
a modem coupled to the controller;
an embedded Subscriber Identity Module coupled to the controller, where the embedded Subscriber Identity Module stores a wireless communication carrier embedded Subscriber Identity Module profile; and
a memory coupled to the controller, where the memory stores a default modem configuration;
where the controller
applies a wireless communication carrier modem configuration corresponding to the wireless communication carrier embedded subscriber identity module profile to the modem, and
communicates with a wireless wide area network via the modem using the wireless communication carrier modem configuration,
where the apparatus further comprises a user interface that receives an input disabling the wireless communication carrier embedded subscriber identity module profile,
where the controller
deactivates the wireless communication carrier modem configuration corresponding to the wireless communication carrier embedded subscriber identity module profile in the modem in response to receiving the input disabling the wireless communication carrier embedded subscriber identity module profile,
applies the default modem configuration to the modem in response to receiving the input disabling the wireless communication carrier embedded subscriber identity module profile, and
communicates via the modem using the default modem configuration,
wherein the modem comprises the memory, and
wherein the controller applies the default modem configuration by updating a feature list in the memory from a feature list corresponding to the default modem configuration, wherein the feature list corresponding to the default modem configuration includes features for operation of the apparatus when there is no wireless communication carrier modem configuration loaded on the modem, and wherein the controller applies the default modem configuration further by updating a first list of emergency phone numbers in the memory with a second list of emergency phone numbers for operation of the apparatus when there is no wireless communication carrier modem configuration loaded on the modem, where the second list is different from the first list.

10. The apparatus according to claim 9, wherein the memory comprises a modem memory, wherein the apparatus comprises an apparatus memory including a default embedded subscriber identity module profile, wherein the controller updates the feature list by updating the feature list in the modem memory with a feature list corresponding to the default modem configuration that corresponds to the default embedded subscriber identity module profile in response to receiving the input disabling the wireless communication carrier embedded subscriber identity module profile.

11. The apparatus according to claim 9, wherein the controller applies the wireless communication carrier modem configuration corresponding to the wireless communication carrier embedded subscriber identity module profile to the modem by:

obtaining wireless communication carrier profile information including a first mobile country code and a first mobile network code from the wireless communication carrier embedded subscriber identity module profile, and activating a wireless communication carrier modem configuration corresponding to the wireless communication carrier profile information, and wherein the controller applies the default modem configuration by overwriting the wireless communication carrier modem configuration with the default modem configuration.

12. The apparatus according to claim 9, wherein the default modem configuration includes an emergency call list and a modem feature list corresponding to the absence of at least one selected from a physical subscriber identify module and a subscriber identify module profile.

13. The apparatus according to claim 9, wherein the memory comprises a modem memory, and wherein the controller deactivates the wireless communication carrier modem configuration by deleting a carrier feature list corresponding to the wireless communication carrier embedded subscriber identity module profile from the modem memory.

14. The apparatus according to claim 9, further comprising a display that displays an option to disable the wireless communication carrier embedded subscriber identity module profile, wherein the input selects the option to disable the wireless communication carrier embedded subscriber identity module profile.

15. The apparatus according to claim 9, wherein the user interface receives an input enabling the wireless communication carrier embedded subscriber identity module profile, and wherein the controller deactivates the default modem configuration in response to receiving the input enabling the wireless communication carrier embedded subscriber identity module profile, applies the wireless communication carrier modem configuration corresponding to the wireless communication carrier embedded subscriber identity module profile to the modem in response to receiving the input enabling the wireless communication carrier embedded subscriber identity module profile, and communicates with the wireless wide area network via the modem using the wireless communication carrier modem configuration.

\* \* \* \* \*